United States Patent
Crisp et al.

(10) Patent No.: US 10,128,780 B2
(45) Date of Patent: Nov. 13, 2018

(54) METHOD AND SYSTEM FOR CONTROLLING THE REGENERATIVE BRAKING OF A VEHICLE

(71) Applicant: FORD GLOBAL TECHNOLOGIES, LLC, Dearborn, MI (US)

(72) Inventors: Nicholas Dashwood Crisp, Benfleet (GB); Anthemios Philemon Petridis, Bishop's Stortford (GB); Rainer Busch, Aachen (DE); Urs Christen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 14/604,213

(22) Filed: Jan. 23, 2015

(65) Prior Publication Data
US 2015/0222209 A1    Aug. 6, 2015

(30) Foreign Application Priority Data
Jan. 31, 2014    (EP) ..................... 14153458

(51) Int. Cl.
*H02P 3/14*    (2006.01)
*B60W 30/18*    (2012.01)

(52) U.S. Cl.
CPC ......... *H02P 3/14* (2013.01); *B60W 30/18127* (2013.01); *B60W 2510/0208* (2013.01); *B60W 2540/103* (2013.01); *B60W 2540/12* (2013.01); *B60W 2540/14* (2013.01); *B60W 2540/16* (2013.01); *B60W 2710/083* (2013.01)

(58) Field of Classification Search
USPC ........ 318/376, 375, 362, 56, 57, 63, 400.09, 318/703, 741, 757, 759, 273; 701/70
See application file for complete search history.

(56) References Cited

U.S. PATENT DOCUMENTS

| | | | |
|---|---|---|---|
| 5,655,990 A * | 8/1997 | Ooyama | B60W 30/18127 180/65.8 |
| 6,183,389 B1 * | 2/2001 | Tabata | B60K 6/387 477/174 |
| 7,347,507 B1 * | 3/2008 | Stillinger | B60T 7/20 303/20 |
| 8,744,659 B2 | 6/2014 | Yamagata et al. | |
| 9,527,388 B2 | 12/2016 | Saito et al. | |

(Continued)

FOREIGN PATENT DOCUMENTS

WO    2008042597 A2    4/2008

*Primary Examiner* — Jorge L Carrasquillo
(74) *Attorney, Agent, or Firm* — David B. Kelley; Brooks Kushman P.C.

(57) ABSTRACT

A method of and a system for controlling the regenerative braking of a vehicle includes initiating a regenerative braking mode in response to an initiating control input to an accelerator of the vehicle, the initiating control input comprising a reduction in the degree of actuation of the accelerator of the vehicle, modifying a level of regenerative braking in the regenerative braking mode in response to at least one of a further reduction in the degree of actuation of the accelerator, application of a brake of the vehicle, application of a clutch of the vehicle, and a change of gear of the vehicle, and maintaining a modified level of regenerative braking after the additional control input has been terminated.

12 Claims, 2 Drawing Sheets

(56) References Cited

U.S. PATENT DOCUMENTS

| | | | |
|---|---|---|---|
| 2002/0030408 A1* | 3/2002 | Niwa | B60K 6/44 |
| | | | 303/152 |
| 2004/0254711 A1* | 12/2004 | Zumberge | B60T 8/885 |
| | | | 701/76 |
| 2008/0269998 A1 | 10/2008 | Shiiba et al. | |
| 2010/0299036 A1* | 11/2010 | Vespasien | B60L 7/18 |
| | | | 701/70 |
| 2011/0307152 A1 | 12/2011 | Shono et al. | |
| 2012/0173057 A1 | 7/2012 | Books | |
| 2013/0162009 A1* | 6/2013 | Mitts | B60L 3/102 |
| | | | 303/3 |
| 2013/0268162 A1* | 10/2013 | Ponziani | B60W 30/00 |
| | | | 701/48 |
| 2015/0006039 A1* | 1/2015 | Hyun | B60W 10/192 |
| | | | 701/48 |

* cited by examiner

METHOD AND SYSTEM FOR CONTROLLING THE REGENERATIVE BRAKING OF A VEHICLE

CROSS-REFERENCE TO RELATED APPLICATION

This application claims foreign priority benefits under 35 U.S.C. § 119(a)-(d) to European patent application EP 14153458.6, filed Jan. 31, 2014, which is hereby incorporated by reference in its entirety.

TECHNICAL FIELD

This disclosure relates to a method and system for controlling the regenerative braking of a vehicle, and in particular, but not exclusively, relates to a method and system for controlling the regenerative braking of a vehicle by modifying a level of regenerative braking in response to one or more control inputs.

BACKGROUND

Regenerative braking is an energy recovery mechanism that is used to decelerate a vehicle by converting its kinetic energy into another form of energy, for example electrical energy. The conversion of the kinetic energy to electrical energy provides a braking effect. The recuperated energy may then be stored, for example in a battery, for use at a later stage.

The powertrain of vehicles, such as electric vehicles or hybrid vehicles, may comprise one or more electric motors. In a common type of regenerative braking, the electric motors may be operated as generators during braking, the output from which may be supplied to an electrical load of the vehicle. Additionally and/or alternatively, the output from the generator may be supplied to an energy storage device for subsequent use in powering the electrical loads, vehicle components with high power requirements and/or a propulsion system of the vehicle, for example.

During the operation of hybrid vehicles, for example mild hybrid vehicles, it is desirable to maximize the regenerative braking during deceleration of the vehicle, which may be due to, for example, the release of the accelerator pedal. However, in maximizing the regenerative braking during accelerator pedal lift-off, the rate of deceleration of the vehicle may appear unexpectedly high to the driver of the vehicle.

These increased levels of deceleration, which may for example be experienced in vehicles comprising a 10 kW electrical motor, create an impression of inefficiency and a lack of ability to coast the vehicle. Furthermore, unexpected deceleration on accelerator pedal release may cause the driver to operate the vehicle in a less efficient manner, which may be detrimental to the customer's perception of the drivability and associated economy of a hybrid system.

SUMMARY

In some examples, there is provided a method of controlling the regenerative braking of a vehicle. The method includes initiating a regenerative braking mode in response to an initiating control input to an accelerator of the vehicle, the initiating control input comprising a reduction in the degree of actuation of the accelerator of the vehicle, modifying a level of regenerative braking in the regenerative braking mode in response to a further reduction in the degree of actuation of the accelerator, application of a brake of the vehicle, application of a clutch of the vehicle, or a change of gear of the vehicle, and maintaining a modified level of regenerative braking after the additional control input has been terminated.

The level of regenerative braking in response to the additional control input may be greater than the level of regenerative braking in response to the initiating control input. The level of regenerative braking may be modified in response to a down-shift of a transmission of the vehicle with the accelerator released. The level of regenerative braking may be proportional to an inferred level of deceleration based on a driver input. The level of regenerative braking may be proportional to a requested level of braking effort. The level of regenerative braking may be modified in response to the actuation of a clutch of the vehicle. The level of regenerative braking may be modified in response at least partial depression of a clutch pedal and/or a brake pedal.

The method may further provide partial regenerative braking whilst the accelerator is partially actuated, whilst the brake is at least partially applied, whilst the clutch is at least partially actuated and/or whilst the transmission of the vehicle is being operated.

The modified level of regenerative braking may be the same as the level of regenerative braking applied in response to the additional control input.

The initiating control input may comprise at least one input to at least one of the accelerator, the brake, the clutch and the gear selector of the vehicle.

The method may comprise further modulating the level of regenerative braking in the regenerative braking mode in response to a change in an operational state of at least one of the accelerator, the brake, the clutch and a gear selector of the vehicle.

The method may further comprise determining a sequence of control inputs to at least one of the accelerator, the brake, the clutch and the gear selector and comparing the sequence to one or more predetermined sequences of control inputs.

The regenerative braking mode may be terminated in response to an increase in the degree of actuation of the accelerator of the vehicle.

The additional control input may occur after the initiating control input. The additional control input may occur before the initiating control input. The additional control input may occur at substantially the same time as the initiating control input.

The method may further comprise determining successive changes in the operational state of the controls of the vehicle, e.g., the accelerator pedal, the brake pedal, the clutch pedal and/or the gear selector of the vehicle. During a deceleration event of the vehicle, the level of regenerative braking of the regenerative braking mode may be modified in response to successive changes in the operational state of any one of the controls of the vehicle.

According to other examples, there is provided a system for controlling the regenerative braking of a vehicle. The system includes one or more control devices configured to initiate a regenerative braking mode in response to an initiating control input to an accelerator of the vehicle, the initiating control input comprising a reduction in the degree of actuation of the accelerator of the vehicle, modify a level of regenerative braking in the regenerative braking mode in response to a further reduction in the degree of actuation of the accelerator, application of a brake of the vehicle, application of a clutch of the vehicle, or a change of gear of the vehicle, and maintain a modified level of regenerative braking after the additional control input has been terminated.

The system may be used, for example, to control the regenerative braking of a motor for an electric vehicle or a hybrid vehicle.

A vehicle may comprise one or more of the above systems for controlling the regenerative braking of the vehicle.

The vehicle may comprise a control device configured to initiate the regenerative braking mode in response to a reduction in the degree of actuation of the accelerator of the vehicle. The control device may be configured to determine a change in the operational state of the accelerator, the brake and/or the powertrain of the vehicle, for example, as a result of one or more driver inputs. The control device may be configured to modify the level of regenerative braking of the regenerative braking mode in response to the change in the operational state of the accelerator, the brake, the powertrain and/or one or more controls of the vehicle Software, such as a computer program or a computer program product for carrying out any of the methods described herein, and a computer readable medium having stored thereon a program for carrying out any of the methods described herein is also provided. Such a computer program may be stored on a computer-readable medium, or it could, for example, be in the form of a signal such as a downloadable data signal provided from an Internet website, or it could be in any other form.

According to still other examples, there is provided a method of controlling the regenerative braking of a vehicle. The method includes determining a change in the operational state of an accelerator of the vehicle, subsequently initiating a regenerative braking mode comprising a first level of regenerative braking dependent upon an input to the accelerator, the brake, the clutch and/or the gear selector by the driver of the vehicle; and a second level of regenerative braking dependent upon the input to the accelerator, the brake, the clutch and/or the gear selector by the driver of the vehicle and a preceding input to the accelerator, the brake, the clutch and/or the gear selector by the driver of the vehicle; and maintaining the second level of regenerative braking after the said input and said preceding input are terminated.

DETAILED DESCRIPTION

As required, detailed embodiments of the present invention are disclosed herein; however, it is to be understood that the disclosed embodiments are merely exemplary of the invention that may be embodied in various and alternative forms. The figure is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain examples provide a method of controlling the regenerative braking of a vehicle, for example an electric vehicle or a hybrid vehicle, whereby upon initial release of an accelerator, the deceleration of the vehicle due to the regenerative braking matches the driver's expected deceleration. The level of regenerative braking may be adjusted in accordance with the operational state of one or more components of the vehicle, for example the accelerator, a brake, a powertrain and/or one or more controls of the vehicle, during a deceleration and/or an acceleration event of the vehicle.

Figure 1:
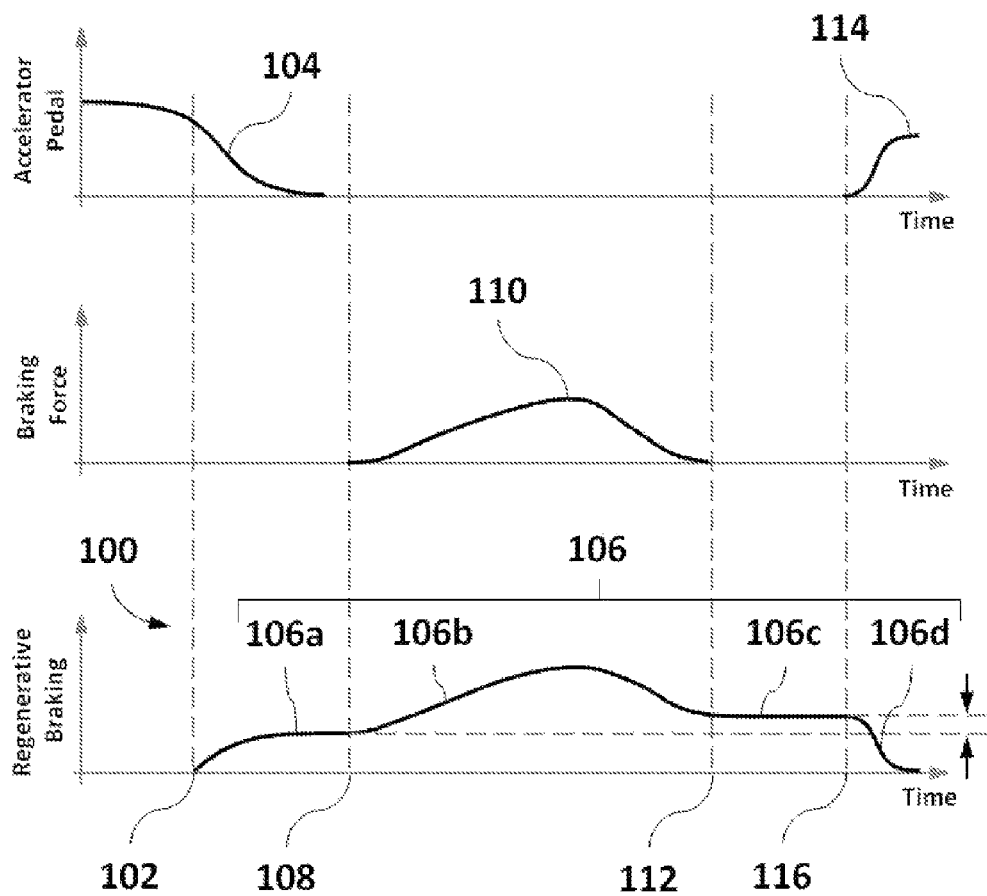
FIG. 1 shows the level of regenerative braking during a deceleration, braking and acceleration event of a vehicle.

A method of controlling the regenerative braking of the vehicle according to an example is shown in FIG. 1. The method comprises initiating a regenerative braking mode 100 in response to an initiating control input 102 to an accelerator of the vehicle, the initiating control input 102 comprising a reduction in the degree of actuation of the accelerator of the vehicle. In an alternative example, however, the initiating control input 102 may comprise at least one input to the accelerator, a brake, a clutch and/or a gear selector of the vehicle.

The regenerative braking mode 100 comprises a level of regenerative braking 106 that may be dependent upon the degree of actuation of the accelerator of the vehicle. In the example shown in FIG. 1, during the deceleration event 104, the reduction in the degree of actuation of the accelerator of the vehicle is caused by the at least partial release of an accelerator pedal by the driver. Hence the level of regenerative braking 106a is dependent upon the progressive release of the accelerator pedal. The level of regenerative braking 106a may, for example, be proportional to the progressive release of the accelerator pedal and/or may be maintained upon complete release of the accelerator pedal. As such, a slight release of the accelerator may cause a lower level of regenerative braking 106a whilst greater release may cause a higher level of regenerative braking 106a. In this manner, the deceleration of the vehicle due to the regenerative braking matches the driver's expected deceleration upon release of the accelerator pedal by the driver.

The method further comprises modifying the level of regenerative braking 106 in the regenerative braking mode 100 in response to one or more additional control inputs 108, wherein the additional control inputs comprise: a further reduction in the degree of actuation of the accelerator of the vehicle; the application of a brake of the vehicle; the application of a clutch of the vehicle; and/or a change of gear of the vehicle.

In the example shown in FIG. 1, the level of regenerative braking 106b in the regenerative braking mode 100 is modified in response to the application of a brake of the vehicle. The level of regenerative braking 106b may be proportional to an inferred level of deceleration based upon a driver input, for example the driver of the vehicle actuating a brake pedal of the vehicle. During the braking event 110 the depression and successive release of the brake pedal results in a corresponding rise and fall in the degree of braking force. Hence the level of regenerative braking 106b is dependent upon the progressive actuation of the brake pedal. The level of regenerative braking 106b in the regenerative braking mode 100 in response to the additional control input 108 may be, therefore, greater or less than the level of regenerative braking 106a in response to the initiating control input 102.

In the example shown in FIG. 1, the additional control input 108 occurs after the initiating control input 102. However in an alternative example, the additional control input 108 may occur before or simultaneously with the initiating control input 102.

In another example, the level of regenerative braking 106b may be proportional to a requested level of braking effort by the driver and/or a control system of the vehicle, for example a cruise control system. In another example, the level of regenerative braking 106b may be adjusted in response to a down-shift of a transmission of the vehicle with the accelerator released.

The method further comprises maintaining a modified level of regenerative braking 106c after the additional control input 108 has been terminated. In the example shown in FIG. 1, the modified level of regenerative braking 106c is maintained at a greater level than the level of regenerative braking 106a that was maintained upon complete release of the accelerator pedal, i.e. the modified level of regenerative braking 106c is greater after the braking event 110 than before the braking event 110. In this manner, upon the release of the brake 112, the modified level of regenerative braking 106c reflects the recent request for deceleration of the vehicle determined from a history of inputs. Thus, the recuperated kinetic energy due to regenerative braking may be maximized without altering the driver's perceived deceleration of the vehicle.

In an alternative example, the modified level of regenerative braking 106c may be maintained at a level less than or substantially equal to the level of regenerative braking 106a that was maintained upon complete release of the accelerator pedal.

The method may further comprise terminating the regenerative braking mode 100 in response to an increase in the degree of actuation of the accelerator of the vehicle. In the example shown in FIG. 1, the subsequent application of the accelerator 116, indicating no further need of deceleration, is used to cancel the regenerative braking mode 100. The level of regenerative braking 106d during an acceleration event 114 may be proportional to the degree by which the actuation of the accelerator is increased. As such, a slight depression of the accelerator pedal may cause a lesser reduction in the level of regenerative braking 106d, whilst greater depression may cause a greater reduction of the level of regenerative braking 106d. In this manner, the acceleration of the vehicle matches the driver's expected acceleration upon depression of the accelerator pedal 116 by the driver.

The method of controlling the regenerative braking of the vehicle may further comprise determining a sequence of control inputs to the accelerator, the brake, the clutch and/or the gear selector of the vehicle and comparing the sequence to one or more predetermined sequences of control inputs. In this manner, the intention of the driver may be anticipated. For example, a significant increase in the speed of an engine caused by a down-shift of the transmission with the accelerator substantially released may indicate that the driver is attempting to decelerate the vehicle rapidly. In such scenarios, higher levels of regenerative braking may be initiated to aid the deceleration of the vehicle. Conversely, upon comparison of the sequence of control inputs to the predetermined sequence of inputs, the operation of the clutch pedal may cause a reduction in the level of regenerative braking 106 of the regenerative braking mode 100 if it is determined that the operation of the clutch indicates the driver's intention to accelerate the vehicle.

The method may comprise further modulating the level of regenerative braking 106 in the regenerative braking mode 100 in response to a change in an operational state of at least one of the accelerator, the brake, the clutch and a gear selector of the vehicle. The modified level of regenerative braking 106c may be varied depending upon the operational requirements of the vehicle, for example the modified level of regenerative braking 106c may be increased or decreased depending upon the gradient of the terrain that the vehicle is travelling on.

In summary of the example shown in FIG. 1, the initial lift-off of the accelerator pedal 102 by the driver causes a low level of regenerative braking 106 consistent with an expected level of deceleration of the vehicle. The subsequent application of the brake 108 causes a higher level of deceleration consistent with the expected level of deceleration consequent of the regenerative braking force and the application of the brake. Upon release of the brake 112, the modified level of regenerative braking 106c is maintained at a higher level than the level of regenerative braking 106a before the braking event 110. In this manner, the pedal-released regenerative braking is maximized without altering the driver's perceived deceleration characteristics of the vehicle. The higher deceleration consequent on the modified level of regenerative braking 106c of the regenerative braking mode 100 may be reset by a subsequent request for acceleration 116 via the accelerator pedal.

According to another embodiment, there is provided a system for controlling the regenerative braking of a vehicle. The system comprises one or more control devices configured to initiate a regenerative braking mode in response to an initiating control input to an accelerator of the vehicle, the initiating control input comprising a reduction in the degree of actuation of the accelerator of the vehicle. The control device is further configured to modify a level of regenerative braking in the regenerative braking mode in response to an additional control input, the additional control input comprising a further reduction in the degree of actuation of the accelerator, application of a brake of the vehicle, application of a clutch of the vehicle and/or a change of gear of the vehicle. The control device is further configured to maintain a modified level of regenerative braking after the additional control input 108 has been terminated.

The control device may comprise one or more sensors that are configured to determine the operational state of the accelerator, the brake and/or the powertrain of the vehicle. For example, a pressure sensor may determine the operation of the brake and one or more sensors may be configured to determine the rotational speed of a plurality of components of the powertrain. Alternatively and/or additionally, the control device may comprise one or more sensors configured to determine in what manner the driver is operating the vehicle, for example by virtue of operation of the accelerator pedal, the brake pedal, the clutch and/or the gear selector of the vehicle.

The method of controlling the regenerative braking of the vehicle may be applicable to both series and parallel braking configurations. The method may be equally applicable to other forms of hybridization, such as compressed air hybridization.

The method of controlling the regenerative braking of the vehicle allows the maximum regenerative energy to be recuperated in real-world and on-cycle situations, whilst also providing a means to deliver light regeneration at initial accelerator pedal release with the associated improvements in driver anticipation and perceived vehicle efficiency.

Figure 2:
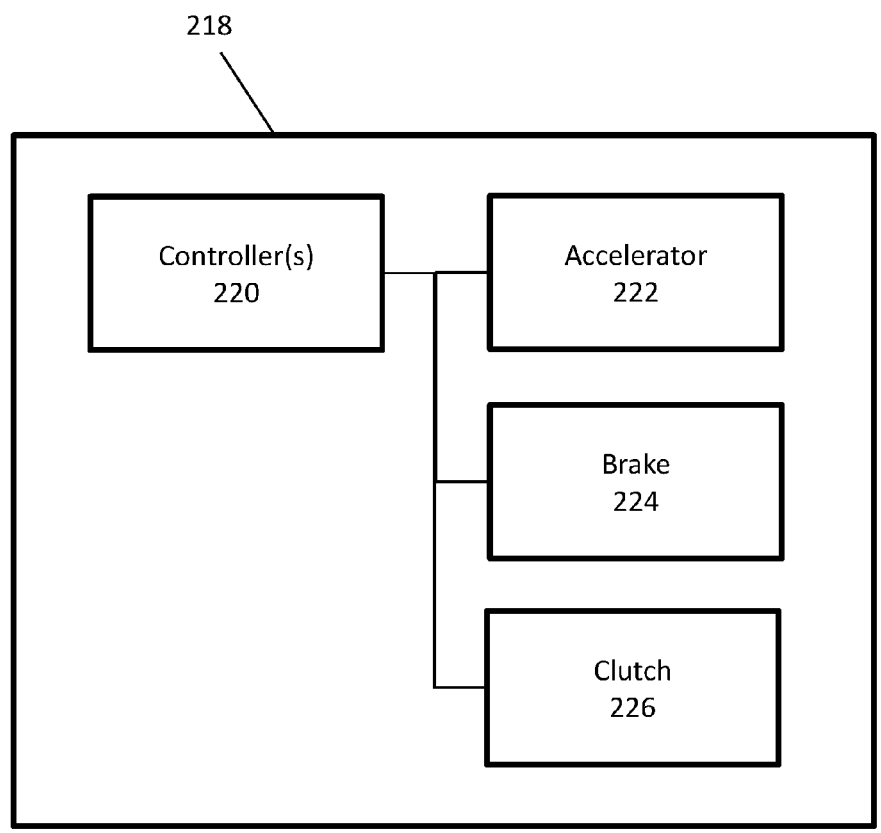
FIG. 2 shows a schematic diagram of a vehicle.

In the example of FIG. 2, a vehicle 218 includes a controller (or controllers) 220, an accelerator 222, a brake 224, and a clutch 226. The controller is in communication with the accelerator 222, brake 224 and clutch 226. The methods or algorithms contemplated herein may be performed by such elements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle comprising:
   initiating a level of regenerative braking responsive to a reduction in degree of an accelerator actuation;
   modifying the level of regenerative braking to a modified level greater than the level responsive to application of a brake; and
   maintaining the modified level after the application of the brake has been terminated until the degree of the accelerator actuation increases.

2. A method according to claim 1 further comprising modulating the level of regenerative braking in response to a change in an operational state of the accelerator or brake.

3. A method according to claim 1, wherein the level of regenerative braking is proportional to an inferred level of deceleration based on a driver input.

4. A method according to claim 1, wherein the level of regenerative braking is proportional to a requested level of braking effort.

5. A vehicle comprising:
   one or more controllers configured to
   initiate a level of regenerative braking responsive to a reduction in degree of an accelerator actuation,
   modify the level of regenerative braking to a modified level greater than the level responsive to further reduction in the degree of the accelerator actuation or to application of a brake, and
   maintain the modified level after the further reduction in the degree of the accelerator actuation or application of the brake has been terminated until the degree of the accelerator actuation increases.

6. A vehicle according to claim 5, wherein the one or more controllers are further configured to modulate the level of regenerative braking in response to a change in an operational state of the accelerator or brake.

7. A vehicle according to claim 5, wherein the level of regenerative braking is proportional to an inferred level of deceleration based on a driver input.

8. A vehicle according to claim 5, wherein the level of regenerative braking is proportional to a requested level of braking effort.

9. A vehicle comprising:
   one or more controllers configured to
   initiate a level of regenerative braking responsive to a reduction in degree of an accelerator actuation,
   modify the level of regenerative braking to a modified level greater than the level responsive to application of a clutch or to a change in gear, and
   maintain the modified level after the application of the clutch or change in the gear has been terminated until the degree of the accelerator actuation increases.

10. A vehicle according to claim 9, wherein the one or more controllers are further configured to modulate the level of regenerative braking in response to a change in an operational state of the accelerator, clutch or gear.

11. A vehicle according to claim 9, wherein the level of regenerative braking is proportional to an inferred level of deceleration based on a driver input.

12. A vehicle according to claim 9, wherein the level of regenerative braking is proportional to a requested level of braking effort.

* * * * *